(12) United States Patent
Roh

(10) Patent No.: US 6,980,337 B2
(45) Date of Patent: Dec. 27, 2005

(54) APPARATUS AND METHOD FOR RECORDING DIGITAL DATA ON A HOLOGRAPHIC STORAGE SYSTEM

(75) Inventor: Jae-Woo Roh, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 0 days.

(21) Appl. No.: 10/797,118

(22) Filed: Mar. 11, 2004

(65) Prior Publication Data

US 2004/0218239 A1 Nov. 4, 2004

(30) Foreign Application Priority Data

Apr. 30, 2003 (KR) ...................... 10-2003-0027563

(51) Int. Cl.⁷ ................................................ G03H 1/10
(52) U.S. Cl. .......................... 359/10; 359/11; 359/30; 359/28; 369/103; 365/125
(58) Field of Search .............................. 359/10, 11, 30, 359/35, 24, 28; 369/103, 112.28; 365/125, 365/222

(56) References Cited

U.S. PATENT DOCUMENTS

| | | | |
|---|---|---|---|
| 4,790,612 A | * | 12/1988 | Dickson ...................... 359/12 |
| 2003/0161246 A1 | * | 8/2003 | Chuang ...................... 369/103 |
| 2004/0190358 A1 | * | 9/2004 | Cho ........................... 365/222 |

FOREIGN PATENT DOCUMENTS

JP 2004-127352 A * 4/2004 ..................... 359/1

* cited by examiner

*Primary Examiner*—Fayez G. Assaf
(74) *Attorney, Agent, or Firm*—Bacon & Thomas, PLLC

(57) ABSTRACT

A holographic apparatus includes a mask for modulating a signal beam to generate a modulated signal beam; a conical prism, which has a cone portion and a base portion, for refracting a reference beam to generate a refracted reference beam, wherein the refracted reference beam interferes with the modulated signal beam in a holographic medium to thereby record data thereon, the base portion facing the holographic medium. The holographic apparatus can be miniaturized by a positional relationship between the conical prism and the holographic medium.

7 Claims, 3 Drawing Sheets

APPARATUS AND METHOD FOR RECORDING DIGITAL DATA ON A HOLOGRAPHIC STORAGE SYSTEM

FIELD OF THE INVENTION

The present invention relates to a holographic digital data storage system, e.g., a ROM (read-only memory) system; and, more particularly, to an apparatus and a method for recording digital data on a holographic storage system capable of miniaturizing the holographic digital data storage system, e.g., a conical prism.

BACKGROUND OF THE INVENTION

Conventional holographic digital data storage systems normally employ a page-oriented storage approach. An input device such as an SLM (spatial light modulator) presents recording data in the form of a two dimensional array (referred to as a page). Other architectures have also been proposed wherein a bit-by-bit recording is employed in lieu of the page-oriented approach. All of these systems, however, suffer from a common drawback in that they require the recording of a huge number of separate holograms in order to fill the memory to capacity. A typical page-oriented system using a megabit-sized array would require the recording of hundreds of thousands of hologram pages to reach the capacity of 100 GB or more. Even with the hologram exposure times of millisecond-order, the total recording time required for filling a 100 GB-order memory may easily amount to at least several tens of minutes, if not hours. Thus, another conventional holographic ROM system such as the one shown in FIG. 1A has been developed, where the time required to produce a 100 GB-order capacity disc may be reduced to under a minute, and potentially to the order of seconds.

The conventional holographic storage system (see "Holographic disk recording system", U.S. patent application publication No. US2003/0161246A1, by Ernest Chuang, et al.) shown in FIG. 1A includes a light source 100; HWPs (half wave plates) 102, 112; an expanding unit 104; a PBS (polarization beam splitter) 106; polarizers 108, 114; mirrors 110, 116, 117; a mask 122; a holographic medium 120; and a conical prism 118.

The light source 100 emits a laser beam with a constant wavelength, e.g., a wavelength of 532 nm. The laser beam of only one type of linear polarization, e.g., either P- or S-polarization, is provided to the HWP 102. The HWP 102 rotates the polarization of the laser beam by θ degree (preferably 45°). And then, the polarization-rotated laser beam is fed to the expanding unit 104 for expanding the beam size of the laser beam up to a predetermined size. Thereafter, the expanded laser beam is provided to the PBS 106.

The PBS 106, which is manufactured by repeatedly depositing at least two kinds of materials, each having a different refractive index, serves to transmit one type of polarized laser beam, e.g., P-polarized beam, and reflect the other type of polarized laser beam, e.g., S-polarized beam. Thus the PBS 106 divides the expanded laser beam into a transmitted laser beam (hereinafter called a signal beam) and a reflected laser beam (hereinafter called a reference beam) having different polarizations, respectively.

The signal beam, e.g., of a P-polarization, is fed to the polarizer 108, which removes imperfectly polarized components of the signal beam and allows only the purely P-polarized component thereof to be transmitted therethrough. And then the signal beam with perfect or purified polarization is reflected by the mirror 110. Thereafter, the reflected signal beam is projected onto the holographic medium 120 via the mask 122. The mask 122, presenting data patterns for recording, functions as an input device, e.g., a spatial light modulator (SLM).

Meanwhile, the reference beam is fed to the HWP 112. The HWP 112 converts the polarization of the reference beam such that the polarization of the reference beam becomes identical to that of the signal beam. And then the reference beam with converted polarization is provided to the polarizer 114, wherein the polarization of the reference beam is further purified. And the reference beam with perfect polarization is reflected by the mirror 116 and then the mirror 117 sequentially. Thereafter, the reflected reference beam is projected onto the conical prism 118 (the conical prism 118 being of a circular cone having a circular base with a preset base angle between the circular base and the cone), which is fixed by a holder (not shown). The reflected reference beam is refracted toward the holographic medium 120 by the conical prism 118. The angle of incidence of the refracted reference beam on the holographic medium 120 is determined by the base angle of the conical prism 118.

The holographic medium 120 is preferably of a disk-shaped material for recording the data patterns. The mask 122, also having a disk shape of a similar size to that of the holographic medium 120, provides the data patterns to be stored in the holographic medium 120. By illuminating the mask 122 with a normally incident plane wave, i.e., the signal beam, and by using the reference beam incident from the opposite side to record holograms in the refraction geometry, the diffracted pattern is recorded in the holographic medium 120. Furthermore, an angular multiplexing can be realized by using the conical prism 118 with a different base angle.

FIG. 1B depicts optical paths of the reference beam from the conical prism 118 to the holographic medium 120 in the conventional holographic storage system of FIG. 1A.

The circular base of the conical prism 118 is preferably parallel with the holographic medium 120, and does not face the holographic medium 120, i.e., a vertex of the conical prism 118 faces the holographic medium 120. The holographic medium 120 is provided with a hole region 120b at the center thereof and an annular-shaped recording region 120a therearound. Further, the symmetry axis of the holographic medium 120 is coincident with that of the conical prism 118 passing through the vertex thereof.

As shown in FIG. 1B, the reference beam with a radius of W1 strikes the circular base of the conical prism 118. The reference beam propagates in a first propagating direction which is perpendicular to the holographic medium 120, i.e., to the circular base. The reference beam is not refracted at the circular base, because the first propagating direction is normal to the circular base. Thus, the reference beam also propagates in the medium of the conical prism 118 in the first propagating direction until the reference beam reaches the surface of the cone of the conical prism 118. At the surface of the cone, the reference beam is refracted, to thereby produce the refracted reference beam which then propagates toward the holographic medium 120 in the medium of the air in a second propagating direction as shown in FIG. 1B, while obeying Snell's law.

In FIG. 1B, the surface of the cone includes a first half cone surface 118a and a second half cone surface 118b. Moreover, the holographic medium 120 includes a first half recording region 120aa which is located on the same side as that of the first half cone surface 118a and a second half recording region 120ab which is located on the same side as that of the second half cone surface 118b. A first half reference beam is transmitted to the first half cone surface 118a after passing through the circular base and then refracted toward the second half recording region 120ab and a second half reference beam is transmitted to the second half cone surface 118b after passing through the circular base and then refracted toward the first half recording region 120aa.

Therefore, as shown in FIG. 1B, near the holographic medium 120, the refracted first half reference beam and the refracted second half reference beam form a conical shell beam shape whose center portion is empty so that a cross section of the conical shell beam shape cut by a plane parallel with the holographic medium 120 may be an annular shape.

After the reference beam with a radius of W1 is refracted at the cone surface 118, the size of the refracted reference beam (i.e., the width thereof being equal to one-half of the difference between the outer and the inner diameters of the annular-shaped cross section thereof) is decreased down to W2 because a refractive index of the conical prism 118 is larger than 1.

In case the size of the recording region 120a (i.e., the width thereof being equal to one-half of the difference between the outer and the inner diameters thereof) of the holographic medium 120 is W3 as shown in FIG. 1B, the size W2 of the refracted reference beam needs to be equal to or larger than W3 in order to write data on the recording region at once.

However, there is a critical problem in the prior art as follows.

A radius of the circular base of the conical prism 118 is preferably slightly larger than (approximately equal to) that of the reference beam W1 such that the entire refracted reference beam with the size of W2 is irradiated onto the recording region 120a with the size of W3. However, since the radius of the circular base is larger than W2 which is equal to or larger than W3, the size of the conical prism 118, i.e., the radius of the circular base, should be larger than that of the recording region 120a. Thus, the size of the conical prism 118 becomes larger so that the conventional holographic digital data storage system cannot be miniaturized.

SUMMARY OF THE INVENTION

It is, therefore, an object of the present invention to provide an apparatus and a method for recording digital data on a holographic storage system capable of miniaturizing the holographic storage system, e.g., a conical prism.

In accordance with one aspect of the present invention, there is provided a holographic apparatus including: a mask for modulating a signal beam to generate a modulated signal beam; a conical prism, which includes a cone portion and a base portion, for refracting a reference beam to generate a refracted reference beam, wherein the refracted reference beam interferes with the modulated signal beam in a holographic medium to thereby record data thereon, the base portion facing the holographic medium.

In accordance with another aspect of the present invention, there is provided a holographic apparatus including: a light source for emitting a laser beam; a beam splitter for dividing the laser beam into a reference beam and a signal beam; a mask for modulating the signal beam to generate a modulated signal beam; and a refractor for refracting the reference beam to generate a refracted reference beam, wherein the refracted reference beam interferes with the modulated signal beam in the holographic medium to thereby record the data thereon.

In accordance with a further aspect of the present invention, there is provided a holographic method including the steps of: (a) generating a laser beam; (b) dividing the laser beam into a reference beam and a signal beam; and (c) modulating the signal beam to generate a modulated signal beam and, at the same time, refracting the reference beam to generate a refracted reference beam, wherein the refracted reference beam interferes with the modulated signal beam in the holographic medium to thereby record the data thereon.

BRIEF DESCRIPTION OF THE DRAWINGS

The above and other objects and features of the present invention will become apparent from the following description of the preferred embodiment given in conjunction with the accompanying drawings, in which.

DETAILED DESCRIPTION OF THE PREFERRED EMBODIMENTS

Figure 2:
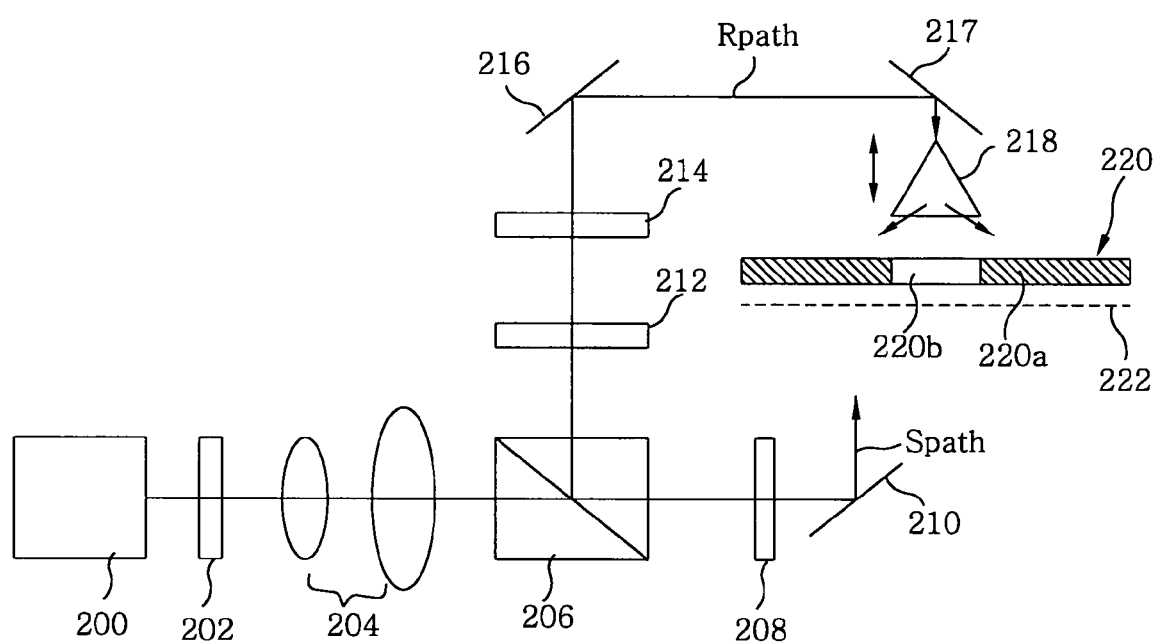
FIG. 2 describes a holographic storage system in accordance with a preferred embodiment of the present invention.

FIG. 2 shows a holographic storage system, e.g., a holographic ROM system, in accordance with a preferred embodiment of the present invention. The holographic storage system of FIG. 2 includes a light source 200; HWPs (half wave plates) 202, 212; an expanding unit 204; a PBS (polarization beam splitter) 206; polarizers 208, 214; mirrors 210, 216, 217; a mask 222; a holographic medium 220; and a conical prism 218.

Figure 1A:
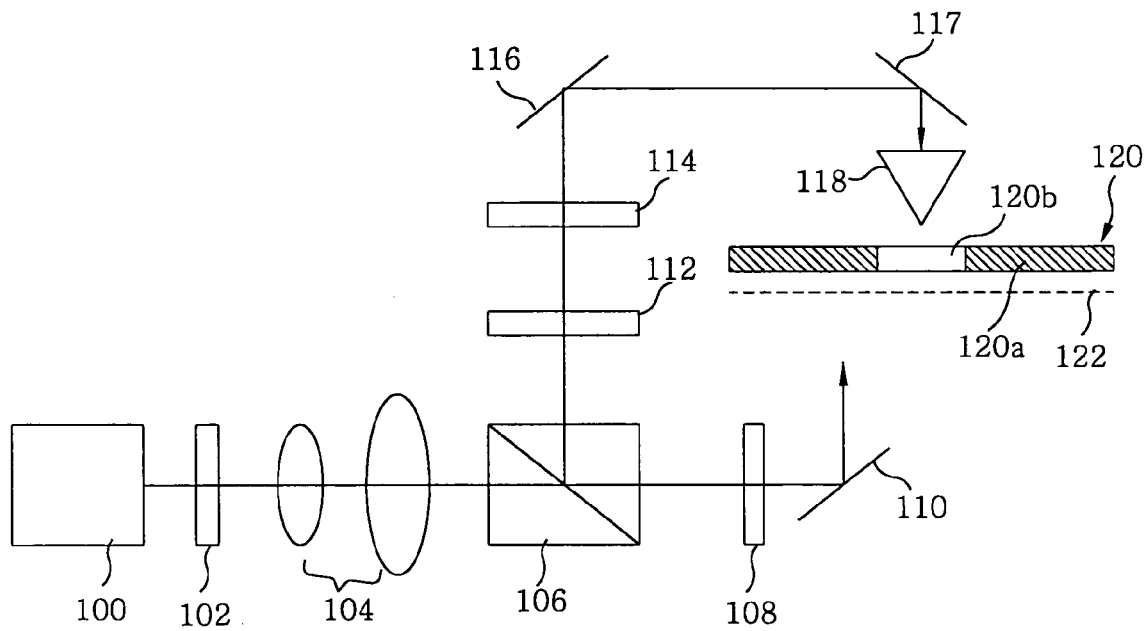
FIG. 1A shows a conventional holographic storage system.
Figure 1B:
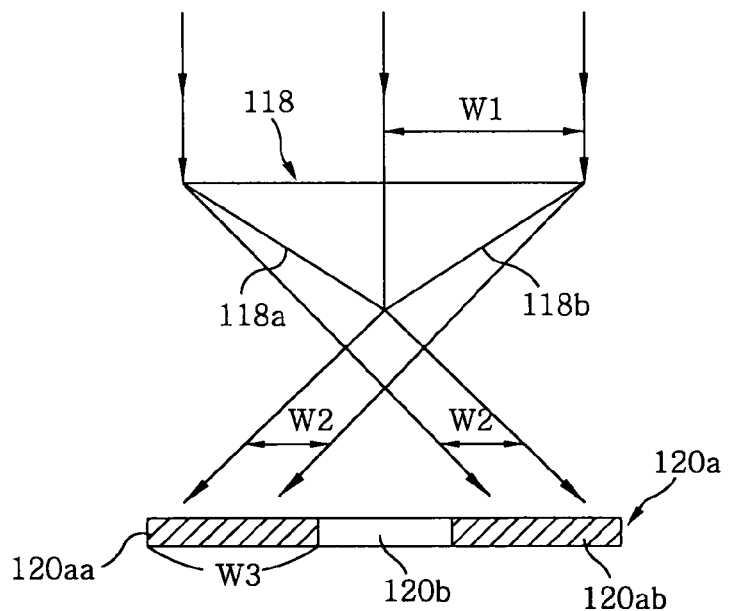
FIG. 1B depicts optical paths of a reference beam from a conical prism to a holographic medium in the conventional holographic storage system of FIG. 1A.

The holographic storage system of the present invention is generally identical to that of the prior art shown in FIGS. 1A and 1B, excepting the conical prism 218 which substitutes for a conical prism 118 in FIGS. 1A and 1B. The functions of the other parts of the holographic storage system of the present invention except the conical prism 218 are basically identical to those of the prior art, so that detailed explanation thereabout is abbreviated.

As shown in FIG. 2, a signal beam is irradiated onto the holographic medium 220 via the polarizer 208, the mirror 210 and the mask 222, which are disposed in that order along a signal beam optical path, i.e., Spath, and a reference beam is irradiated onto the holographic medium 220 from the opposite side via the HWP 212, the polarizer 214, the mirror 216, the mirror 217 and the conical prism 218, which are disposed in that order along a reference beam optical path, i.e., Rpath.

The conical prism 218 is of a circular cone having a circular base with a preset base angle between the circular base and the cone. Herein, the circular base faces the holographic medium 220 and is preferably parallel with the holographic medium 220. The holographic medium 220 preferably has a CD-like disc shape. That is, the holographic medium 220 is provided with a hole region 220b at the center thereof and an annular-shaped recording region 220a therearound as shown in FIG. 3B. The diameter of the circular base of the conical prism 218 is preferably not to be smaller than that of the hole region 220b to maximize the optical efficiency. Further, the symmetry axis of the holographic medium 220 is coincident with that of the conical prism 218 passing through a vertex thereof.

Figure 3A:
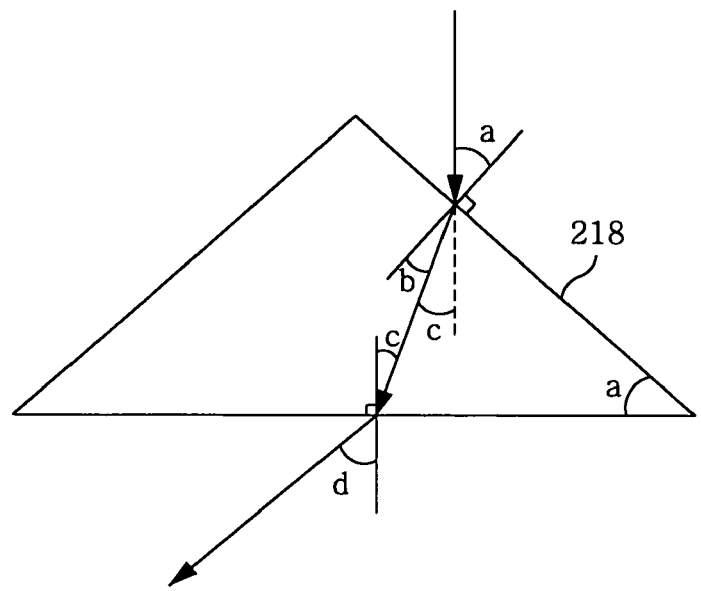
FIG. 3A offers an optical path of a reference beam passing through a conical prism included in the holographic ROM system of FIG. 2.
Figure 3B:
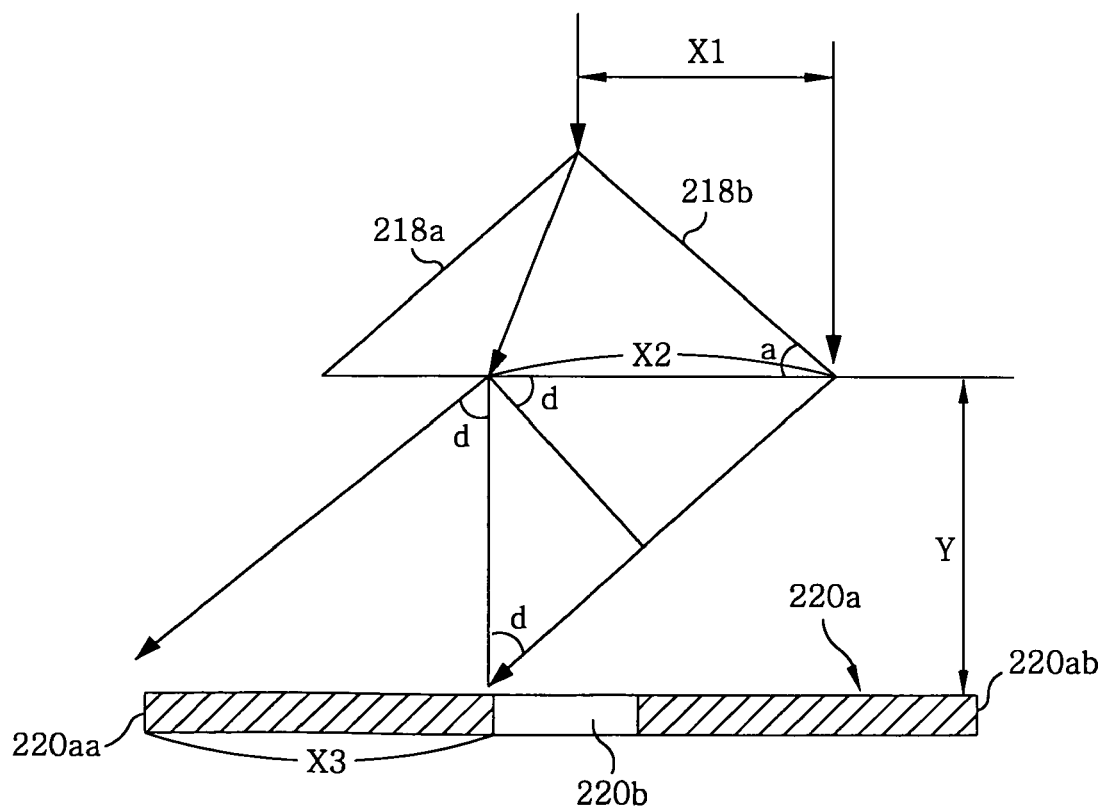
FIG. 3B explains optical paths of the reference beam from the conical prism to a holographic medium in accordance with the preferred embodiment of the present invention.

FIG. 3A offers optical path of the reference beam passing through the conical prism 218 in accordance with the preferred embodiment of the present invention.

The reference beam with a radius of X1, which propagates in a first propagating direction normal to the circular base, strikes a surface of the cone of the conical prism 218. Then, the reference beam is refracted at the surface of the cone so that the refracted reference beam propagates in a second propagating direction in the medium of the conical prism 218, while obeying Snell's law:

$$\sin a = n \sin b \qquad \text{Eq. 1}$$

where the index of refraction of the medium of the conical prism 218 is defined to be 'n', and the index of refraction of the air to be 1. And 'a' represents the base angle, which is an acute angle, i.e., an angle less than 90°. Since 'a' is defined to be the base angle of the conical prism 218, a first angle of incidence, i.e., an angle between the first propagating direction of the reference beam and a first vertical direction normal to the surface of the cone, also becomes 'a', as shown in FIG. 3A. Moreover, an acute angle 'b' indicates a first angle of refraction, i.e., an angle between the second propagating direction of the refracted reference beam and the first vertical direction normal to the surface of the cone.

Then, the refracted reference beam propagates straightly in the second propagating direction in the medium of the conical prism 218 until the refracted reference beam reaches the circular base of the conical prism 218. At the circular base, the refracted reference beam is refracted once more, to thereby produce a twice-refracted reference beam which is then provided to the holographic medium 220 in a third propagating direction through the air as shown in FIG. 3B, while obeying Snell's law:

$$n \sin c = \sin d \qquad \text{Eq. 2}$$

where the indexes of refraction of the medium of the conical prism 218 and the air are 'n' and 1, respectively, as mentioned above. An acute angle 'c' is a second angle of incidence, i.e., an angle between the second propagating direction of the refracted reference beam and a second vertical direction normal to the circular base, and an acute angle 'd' is a second angle of refraction, i.e., an angle between the third propagating direction of the twice-refracted reference beam and the second vertical direction normal to the circular base.

'a', 'b' and 'c' are related by a following equation, as shown in FIG. 3A:

$$b + c = a \qquad \text{Eq. 3}$$

Eq. 1 and Eq. 3 can be arranged resulting in following equations:

$$b = \sin^{-1}(\sin a/n) \qquad \text{Eq. 4}$$

$$c = a - b = a - \sin^{-1}(\sin a/n) \qquad \text{Eq. 5}$$

If Eq. 4 and Eq. 5 are inserted into Eq. 2, a following equation is obtained:

$$n \sin\{a - \sin^{-1}(\sin a/n)\} = \sin d \Rightarrow \sin^{-1}[n \sin\{a - \sin^{-1}(\sin a/n)\}] = d \qquad \text{Eq. 6}$$

Therefore, as shown in Eq. 6, the second angle of refraction 'd' can be adjusted by varying the base angle 'a' of the conical prism 218. Since an angle of incidence of the twice-refracted beam on the holographic medium 220, i.e., an acute angle between the third propagating direction of the twice-refracted reference beam and a third vertical direction normal to the surface of the holographic medium 220, is identical to the second angle of refraction 'd' as shown in FIG. 3B, the angle of incidence of the twice-refracted reference beam on the holographic medium 220 is also determined by the base angle 'a' of the conical prism 218. In Eq. 6, since 'a' is a more dominant factor than 'sin⁻¹(sin a/n)', 'd' becomes increased as 'a' increases.

In FIG. 3B, the reference beam with a radius of X1 is irradiated onto the surface of the cone of the conical prism 218. The surface of the cone includes a first half cone surface 218a and a second half cone surface 218b. Moreover, the holographic medium 220 includes a first half recording region 220aa which is located on the same side as that of the first half cone surface 218a and a second half recording region 220ab which is located on the same side as that of the second half cone surface 218b. A first half reference beam refracted at the first half cone surface 218a is refracted once more at the circular base to be provided to the second half recording region 220ab and a second half reference beam refracted at the second half cone surface 218b is refracted once more at the circular base to be provided to the first half recording region 220aa.

Considering only the second half reference beam for the convenience of depiction as shown in FIG. 3B, after the second half reference beam, whose cross section cut by a plane parallel with the holographic medium 220 is a hemicyclic shape with a radius of X1, is refracted at the second half cone surface 218b, the beam size (i.e., width) of the refracted second half reference beam is increased up to X2 at the circular base of the conical prism 218 because 'n' is larger than 1. Then the refracted second half reference beam with the size of X2 is refracted once more at the circular base to thereby become a twice-refracted second half reference beam which is illuminated onto the first half recording region 220a of the holographic medium 220 with the angle of incidence being 'd'.

In case the size of the recording region 220a (i.e., the width thereof being equal to one-half of the difference between the outer and the inner diameters thereof) of the holographic medium 220 is X3 as shown in FIG. 3B, the beam size X2 of the twice-refracted second half reference beam needs to be equal to or larger than X3 in order to write data on the recording region 220a at once. Then, the relationship between X1, X2 and X3 can be defined as:

$$X2 = X1/\cos d > X3 = > d < \cos^{-1}(X1/X3) \qquad \text{Eq. 7}$$

If Eq. 7 is inserted into Eq. 6, a following equation is obtained:

$$\sin^{-1}[n \sin\{a - \sin^{-1}(\sin a/n)\}] = d < \cos^{-1}(X1/X3) \qquad \text{Eq. 8}$$

The location on the holographic medium 220, where the twice-refracted reference beam is projected, may vary with a distance 'Y' between the circular base of the conical prism 218 and the holographic medium 220. In order for a portion of the twice-refracted reference beam passing through a periphery of the circular base to be irradiated onto a borderline between the recording region 220a and the hole region 220b of the holographic medium 220, the distance 'Y' can be depicted as:

$$Y = X2/\tan d \qquad \text{Eq. 9}$$

Thus, the angle of incidence 'd' of the twice-refracted reference beam is also determined by the distance 'Y'.

A radius of the circular base of the conical prism 218 is preferably slightly larger than (approximately equal to) that of the reference beam X1 such that the entire reference beam is irradiated onto the recording region 220a having the size of X3.

However, since the radius of the circular base is smaller than X2 which is not smaller than the size of the recording region 220a, the size of the conical prism 218, i.e., the radius of the circular base, need not be larger than that of the recording region 220a. Thus, the size of the conical prism 218 can be made to be smaller than X3 so that the holographic storage system can be miniaturized.

When the present invention is compared with the prior art shown in FIG. 1B, a reference beam is irradiated from a conical prism 118 of the prior art onto a holographic medium 120 after only one refraction procedure thereby, but the conical prism 218 of the present invention performs two refraction procedures therethrough. According to the prior art, a size of the reference beam is reduced due to only one refraction procedure so that sizes of the conical prism 118 and the reference beam irradiated onto the conical prism 118 should be larger than those of the present invention. However, in accordance with the present invention, a size of the reference beam is increased due to two refraction procedures so that sizes of the conical prism 218 and the reference beam become smaller than those of the prior art. Therefore, a size of the holographic storage system can be greatly miniaturized in accordance with the present invention.

While the invention has been shown and described with respect to the preferred embodiments, it will be understood by those skilled in the art that various changes and modifications may be made without departing from the spirit and the scope of the invention as defined in the following claims.

What is claimed is:

1. A holographic apparatus comprising:
   a mask for modulating a signal beam to generate a modulated signal beam;
   a conical prism, which includes a cone portion and a base portion, for refracting a reference beam to generate a refracted reference beam, wherein the refracted reference beam interferes with the modulated signal beam in a holographic medium to thereby record data thereon, the base portion facing the holographic medium.

2. The apparatus of claim 1, wherein an optical path of the refracted reference beam depends on a refractive index of the conical prism.

3. The apparatus of claim 1, wherein the conical prism is replaced with another one having a different base angle for multiplexing.

4. The apparatus of claim 1, wherein an optical path of the refracted reference beam is controlled by the following relationship of:

$$\sin^{-1}[n\sin\{a-\sin^{-1}(\sin a/n)\}]=d,$$

wherein 'n' is an index of refraction of the medium of the conical prism, 'a' indicates the base angle of the conical prism, and 'd' is an angle of incidence on the holographic medium.

5. The apparatus of claim 4, wherein the angle 'd' satisfies the relationship of:

$$X2=X1/\cos d>X3,$$

wherein 'X1' is one-half of the full size of the reference beam which is projected onto the conical prism, 'X2' is a beam size of the refracted reference beam of one-half of the full size of the reference beam at the base portion of the conical prism, and 'X3' is one-half of the difference between the outer and the inner diameters of the recording region of the holographic medium.

6. The apparatus of claim 1, wherein a distance between the conical prism and the holographic medium is varied for multiplexing.

7. The apparatus of claim 6, wherein the distance is determined by the formula of:

$$\tan d = X2/Y,$$

wherein 'd' is an angle of incidence on the holographic medium, 'X2' is a beam size of the refracted reference beam at the base portion of the conical prism, and 'Y' is the distance between the conical prism and the holographic medium.

* * * * *